(12) United States Patent
Takeuchi

(10) Patent No.: US 10,718,269 B2
(45) Date of Patent: Jul. 21, 2020

(54) AIRCRAFT SEAL STRUCTURE AND AIRCRAFT

(71) Applicant: MITSUBISHI AIRCRAFT CORPORATION, Aichi (JP)

(72) Inventor: Akira Takeuchi, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 339 days.

(21) Appl. No.: 15/831,574

(22) Filed: Dec. 5, 2017

(65) Prior Publication Data

US 2018/0156130 A1    Jun. 7, 2018

(30) Foreign Application Priority Data

Dec. 5, 2016  (JP) ................. 2016-235818

(51) Int. Cl.

| F02C 7/25 | (2006.01) |
|---|---|
| E04B 1/94 | (2006.01) |
| B64D 29/00 | (2006.01) |
| B64D 27/26 | (2006.01) |
| B64C 7/00 | (2006.01) |
| B64D 45/00 | (2006.01) |
| B64C 7/02 | (2006.01) |

(52) U.S. Cl.
CPC ............... *F02C 7/25* (2013.01); *B64C 7/00* (2013.01); *B64D 27/26* (2013.01); *B64D 29/00* (2013.01); *B64D 45/00* (2013.01); *E04B 1/948* (2013.01); *B64C 7/02* (2013.01); *B64D 2045/009* (2013.01); *Y02T 50/671* (2013.01)

(58) Field of Classification Search
CPC .......... F16J 15/02; F16J 15/002; F16J 15/027; F02C 7/25
USPC .............................................. 49/480.1, 484.1
See application file for complete search history.

(56) References Cited

U.S. PATENT DOCUMENTS

| 3,104,436 | A | * | 9/1963 | Ostolaza | ................ | A44B 11/04 |
| | | | | | | 24/198 |
| 5,676,082 | A | * | 10/1997 | Kyle | ...................... | B63B 19/26 |
| | | | | | | 114/201 R |
| 9,505,357 | B2 | * | 11/2016 | Ksiezopolski | ............ | B60P 3/34 |
| 2009/0174155 | A1 | * | 7/2009 | Yu | .......................... | F16J 15/104 |
| | | | | | | 277/650 |
| 2015/0048202 | A1 | | 2/2015 | Takeuchi | | |
| 2015/0367947 | A1 | * | 12/2015 | Audart-Noel | .......... | B64D 29/06 |
| | | | | | | 244/54 |

(Continued)

FOREIGN PATENT DOCUMENTS

| JP | 3104436 B2 * 10/2000 |
| JP | 2014-141202 A     8/2014 |

*Primary Examiner* — Philip J Bonzell
*Assistant Examiner* — Tye William Abell
(74) *Attorney, Agent, or Firm* — Osha Liang LLP

(57) ABSTRACT

A seal structure for sealing a gap between a first member and a second member of an aircraft includes: a plate spring-shaped first elastic seal; and a second elastic seal. When the first member and the second member are stationary with respect to each other, the first elastic seal elastically deforms between the first member and the second member to seal the gap, whereas the second elastic seal does not seal the gap. When the first member and the second member move closer to each other and the first elastic seal is elastically deformed, the second elastic seal elastically deforms between the first member and the second member to seal the gap.

11 Claims, 10 Drawing Sheets

(56) References Cited

U.S. PATENT DOCUMENTS

2017/0102072 A1\* 4/2017 Ksiezopolski ............ B60P 3/34

\* cited by examiner

AIRCRAFT SEAL STRUCTURE AND AIRCRAFT

BACKGROUND OF THE INVENTION

Field of the Invention

The present invention relates to a seal structure for an aircraft and to an aircraft.

The seal structure for the aircraft includes, as one form, a fire seal structure that prevents flame from coming out of a fire-prevention region of the aircraft.

Description of the Related Art

A fire-prevention region is designated around an ignition source that may generate flame, such as an engine main body and an auxiliary power unit of an aircraft, and it is required to prevent the flame generated inside the fire-prevention region from coming out of the fire-prevention region.

For example, the fire-prevention region that confines the flame generated from the engine main body (engine core) is designated inside an engine nacelle.

When the fire occurs from the engine main body, it is necessary to prevent the flame from passing through a gap between the engine nacelle and a pylon to blow off to outside. Accordingly, the gap between the engine nacelle and the pylon is sealed by an elastic seal (JP 2014-141202 A).

Members around the engine main body, for example, the engine nacelle, the pylon, and accessories attached to the pylon or the engine main body, are relatively largely moved when receiving external force such as a load in landing and an aerodynamic load and vibration in flight. To seal, by the elastic seal, a connection portion between the members that are relatively largely moved and to prevent penetration of the flame and leakage of flammable fluid, it is desirable to sufficiently secure a seal contact surface of a member with which the elastic seal comes into contact. The seal contact surface, however, may not be sufficiently secured in some cases because it is necessary to avoid interference with other members.

For example, as illustrated in FIG. 10A, it is assumed that it is not possible to increase a length any more, in a radial direction, of a flange 921 of a member 92 on which a plate spring seal 9 attached to a member 91 abuts.

In this case, if a front end part 9A of the plate spring seal 9 is moved and goes beyond a seal contact surface 921A when the member 91 and the member 92 are relatively largely moved in a way in which the member 91 and the member 92 are brought close to each other and the plate spring seal 9 is elastically deformed, the sealing is not performed because the front end part 9A is not pressed against the seal contact surface 921A.

On the other hand, as illustrated in FIG. 10B, in a case where a hollow valve seal 93 made of a rubber material is used as the elastic seal, for example when the member 92 is moved from a position illustrated by an alternate long and short dash line to a position illustrated by a solid line and the member 91 and the member 92 are accordingly brought close to each other, the valve seal 93 is wholly compressed and comes into tight contact with the seal contact surface 921A. This makes it possible to seal a gap between the flange 921 and the member 91.

The valve seal 93, however, comes into contact with an end edge 921B of the flange 921 when the valve seal 93 goes beyond the seal contact surface 921A, which may cause damage or life deterioration of the valve seal 93.

Note that the valve seal 93 in an unloaded state is illustrated by an alternate long and two short dashes line in FIG. 10B.

SUMMARY OF THE INVENTION

One or more embodiments of the present invention provide a seal structure for an aircraft that makes it possible to surely seal, by an elastic seal, a gap between members that are relatively largely displaced even when a seal contact surface of a member with which the elastic seal comes into contact is not sufficiently secured, and to reduce burden on maintenance such as inspection and replacement of the elastic seal, and to provide an aircraft.

A seal structure for an aircraft according to one or more embodiments of the present invention seals a gap between a first member and a second member which are provided in the aircraft.

The seal structure includes a plate spring-shaped first elastic seal that is elastically deformed between the first member and the second member to seal the gap between the first member and the second member in a stationary state in which the first member and the second member are not relatively moved, and a second elastic seal that does not seal the gap between the first member and the second member in the stationary state.

The second elastic seal is elastically deformed between the first member and the second member to seal the gap between the first member and the second member when the first member and the second member are relatively moved in a way in which the first member and the second member are brought close to each other and the first elastic seal is elastically deformed.

In the seal structure for the aircraft according to one or more embodiments of the present invention, the second elastic seal is provided in one of the first member and the second member, and is not in contact with the other of the first member and the second member in the stationary state.

In the seal structure for the aircraft according to one or more embodiments of the present invention, the second elastic seal is elastically deformed to seal the gap between the first member and the second member while a front end part of the first elastic seal is pressed against a seal contact surface of the second member when the first member and the second member are relatively moved in the way in which the first member and the second member are brought close to each other and the first elastic seal is elastically deformed.

In the seal structure for the aircraft according to one or more embodiments of the present invention, one of the first member and the second member is inclined to the other of the first member and the second member, the first elastic seal is disposed on side on which the gap between the first member and the second member is large, and the second elastic seal is disposed on side on which the gap between the first member and the second member is small.

In the seal structure for the aircraft according to one or more embodiments of the present invention, the first member and the second member define a fire-prevention region of the aircraft, the seal structure is a fire seal structure that seals the gap between the first member and the second member to prevent flame from coming out of the fire-prevention region, and the first elastic seal is located on inner side in a way that passes through between the first member and the second member and connects an inside and an outside of the fire-prevention region, and contains a refractory material.

In the seal structure for the aircraft according to one or more embodiments of the present invention, the second elastic seal contains a rubber material.

In the seal structure for the aircraft according to one or more embodiments of the present invention, the second elastic seal is a hollow valve seal.

In the seal structure for the aircraft according to one or more embodiments of the present invention, the second elastic seal is a plate spring seal.

In the seal structure for the aircraft according to one or more embodiments of the present invention, the first elastic seal is fastened to one of the first member and the second member, and the second elastic seal is fastened, together with the first elastic seal, to the one of the first member and the second member by a fastening member that fastens the first elastic seal.

In the seal structure for the aircraft according to one or more embodiments of the present invention, the first member is a duct of a device that is supported to a main body of an engine pylon of the aircraft, the second member is a fairing that covers the main body and includes an opening communicating with the duct, and the seal structure seals a gap between a flange provided in the duct and a wall provided in the fairing so as to surround the opening.

An aircraft according to one or more embodiments of the present invention includes any of the above-described seal structures.

The seal structure according to one or more embodiments of the present invention includes the second elastic seal that functions when the first member and the second member are relatively largely displaced in the way in which the first member and the second member are brought close to each other and the first elastic seal is elastically deformed. Accordingly, it is possible to adopt, as the first elastic seal, the plate spring that has durability higher than a valve seal made of a rubber material and to surely seal the gap between the first member and the second member even when the relative displacement is large, without extending the seal contact surface. On the other hand, the second elastic seal is not located at a position directly exposed to flame. Therefore, a rubber material that has higher sealing property as compared with the plate spring is used for the second elastic seal.

In one or more embodiments, since the first elastic seal contains a material such as a metal material and is configured to function as the plate spring, the first elastic seal is hardly abraded unlike the valve seal containing the rubber material.

In one or more embodiments, friction of the second elastic seal is small even if the second elastic seal is in contact with the seal contact surface, in the stationary state and until the second elastic seal is pressed against the seal contact surface due to relative displacement of the first member and the second member. Accordingly, even when the valve seal is adopted as the second elastic seal, the second elastic seal is little abraded as compared with the single valve seal that is constantly pressed against the seal contact surface.

Consequently, the seal structure according to one or more embodiments of the present invention makes it possible to reduce burden on maintenance of the seal, such as inspection and replacement.

DETAILED DESCRIPTION OF EMBODIMENTS

Embodiments of the present invention are described below with reference to accompanying drawings.

Figure 1:
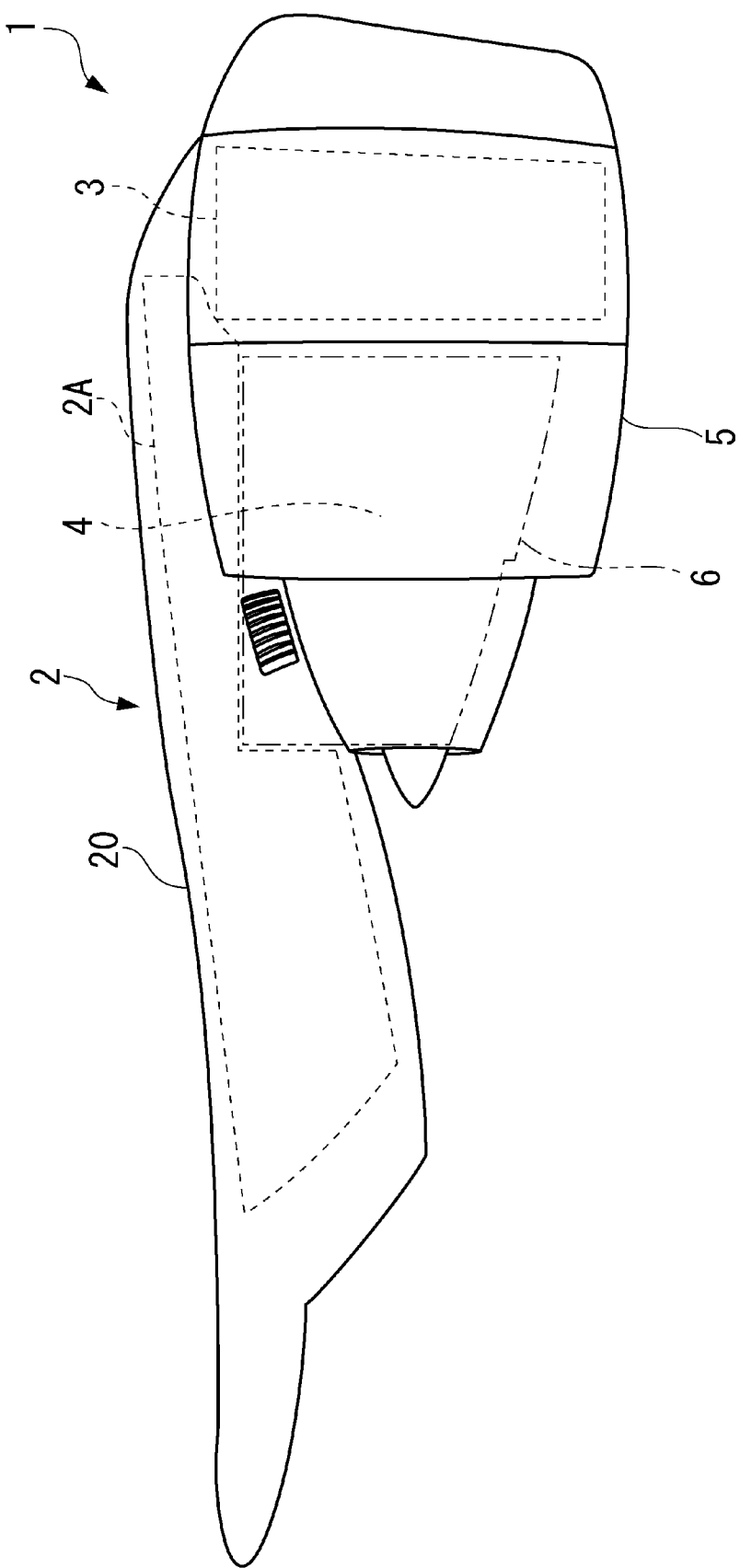
FIG. 1 is a diagram illustrating an engine pylon of an aircraft as viewed from a side thereof according to one or more embodiments of the invention.

An engine 1 of an aircraft illustrated in FIG. 1 is supported to an unillustrated main wing by a pylon 2.

According to one or more embodiments, the engine 1 includes a fan 3, an engine core (compressor and combustion chamber) 4 that is a main body of the engine 1, and a cylindrical engine nacelle 5 that surrounds the fan 3 and the engine core (compressor and combustion chamber) 4.

The pylon 2 includes a pylon main body 2A as a structure member, and a pylon fairing 20 that covers the pylon main body 2A.

A fire-prevention region 6 according to one or more embodiments is defined around the engine core (compressor and combustion chamber) 4 for fire occurred from the engine core (compressor and combustion chamber) 4, and it is required to prevent flame from coming out of the fire-prevention region 6. In FIG. 1, an approximate outer shape of the fire-prevention region 6 around the engine is illustrated by an alternate long and two short dashes line.

In one or more embodiments, it is necessary for some of devices disposed inside the fire-prevention region 6 for example, around the engine core (compressor and combustion chamber) 4 and near the pylon main body 2A, to access to outside of the fire-prevention region 6.

For example, an exhaust duct 10 (FIG. 2) of a heat exchanger that is called precooler extends to the outside of the fire-prevention region 6 and communicates with an exhaust port 21 of the pylon fairing 20. The precooler (not illustrated) cools bleed air from the engine core (compressor and combustion chamber) 4 with use of air that is taken from air flow supplied by the fan 3. The air cooled by the precooler is used for air conditioning in the aircraft. The exhaust gas from the precooler is exhausted to the outside of the aircraft through the exhaust duct 10 as illustrated by an arrow in FIG. 2. The precooler is supported at a lower end of the pylon main body 2A.

Figure 2:
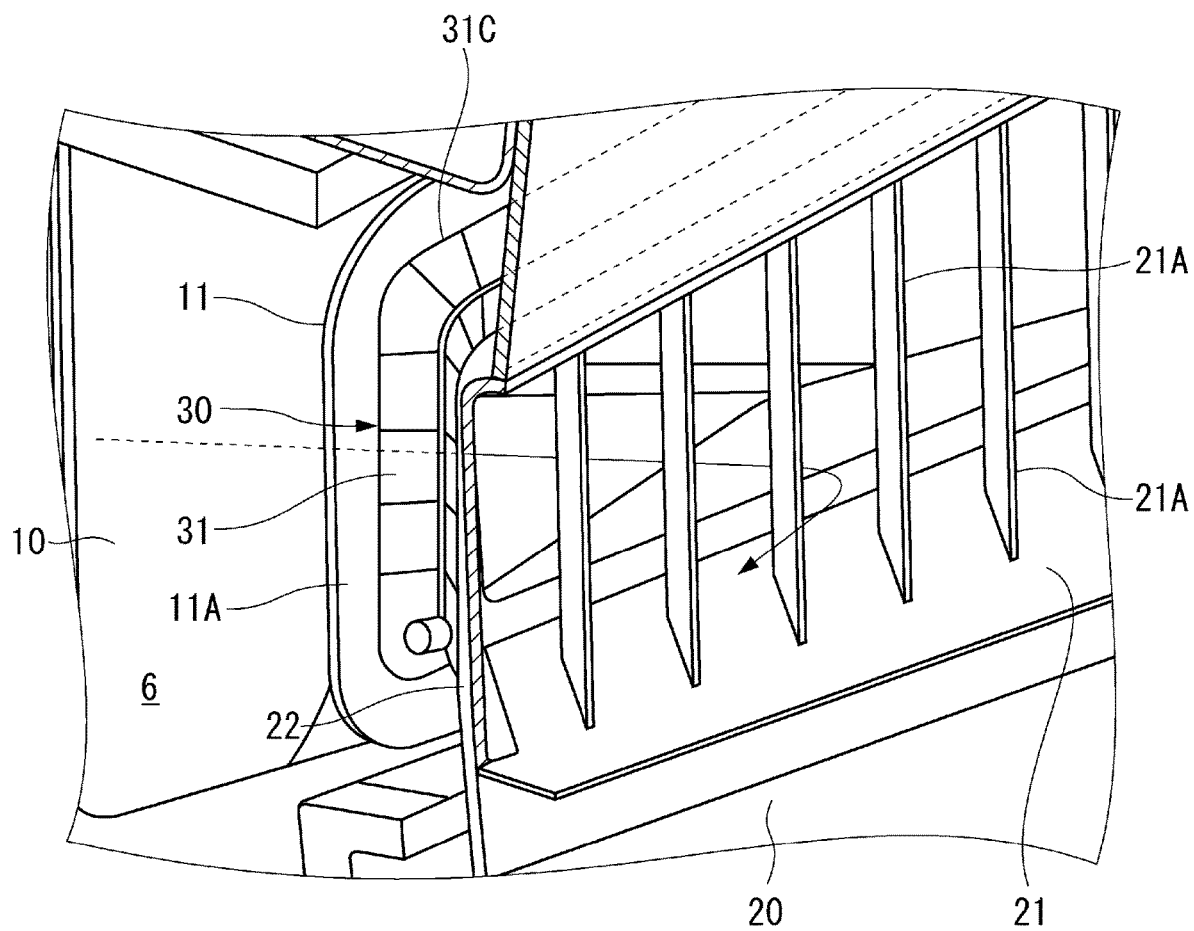
FIG. 2 is a perspective view illustrating an exhaust port provided in a fairing of the engine pylon illustrated in FIG. 1 and an exhaust duct of a precooler that communicates with the exhaust port.

As illustrated in FIG. 2, according to one or more embodiments, the exhaust duct 10 of the precooler is disposed inside the pylon fairing 20. The pylon fairing 20 includes the exhaust port 21 that has a size equivalent to a size of an opening of the exhaust duct 10. The exhaust gas from an unillustrated main body of the precooler flows out to the atmosphere outside the aircraft through the inside of the exhaust duct 10 and the exhaust port 21. A louver that includes a plurality of blade members 21A each guiding the exhaust gas rearward is disposed in the exhaust port 21.

The engine-peripheral fire-prevention region 6 is present around the exhaust duct 10. The fire-prevention region 6 is surrounded by a lower firewall of the pylon main body 2A, the engine nacelle 5 or the pylon fairing 20, and the engine core (compressor and combustion chamber) 4. In a case where flame is present inside the fire-prevention region 6, it is necessary to prevent the flame from coming out of the aircraft through the exhaust port 21 that penetrates through the pylon fairing 20.

Therefore, a fire seal structure 30 is provided at a connection portion between the exhaust duct 10 and the pylon fairing 20 both defining the fire-prevention region 6.

The "fire seal" indicates prevention of flame inside the fire-prevention region 6 from coming out of the fire-prevention region 6.

Note that a connection portion between members other than the exhaust duct 10 and the pylon fairing 20 is also subjected to appropriate measures to prevent the flame from coming out.

As illustrated in FIG. 2, the fire seal structure 30 according to one or more embodiments seals a gap between a flange 11 and a peripheral wall 22 to prevent the flame from coming out of the fire-prevention region 6. The flange 11 is provided at a front end of the exhaust duct 10, and the peripheral wall 22 is provided in the pylon fairing 20 so as to surround the exhaust port 21.

The flange 11 (FIG. 2 and FIG. 3) protrudes outward in a radial direction of the exhaust duct 10.

The peripheral wall 22 (FIG. 2 and FIG. 3) that defines the exhaust port 21 is inclined to the flange 11.

The flange 11 and the peripheral wall 22 face each other over an entire circumference of the exhaust duct 10 and the exhaust port 21.

Figure 3:
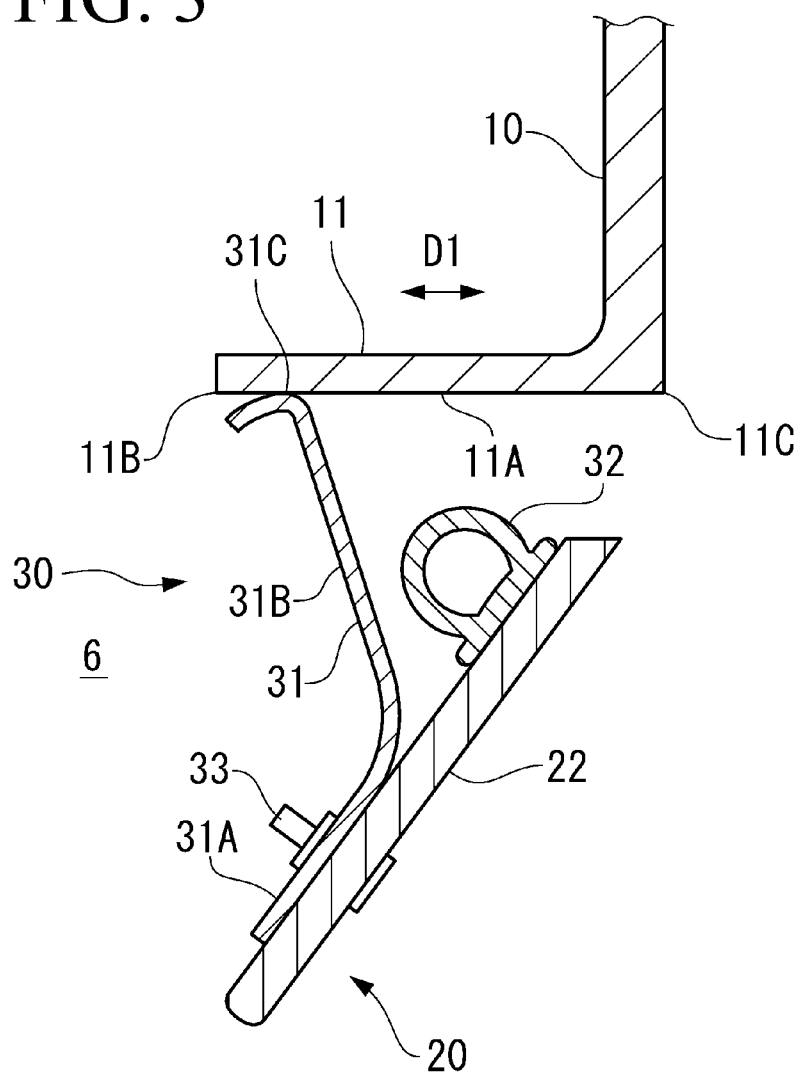
FIG. 3 is a cross-sectional view illustrating a fire seal structure between the exhaust duct of the precooler and the fairing according to one or more embodiments of the invention.

As illustrated in FIG. 3, a gap between an outer end 11B of the flange 11 and the peripheral wall 22 is large, and a gap between an inner end 11C of the flange 11 and the peripheral wall 22 is small.

Incidentally, the exhaust duct 10 and the pylon fairing 20 are relatively largely moved when receiving external force such as a load in landing and an aerodynamic load and vibration in flight.

Even when the exhaust duct 10 and the pylon fairing 20 are relatively largely moved and the flange 11 and the peripheral wall 22 are largely relatively displaced, it is necessary to make the fire seal structure 30 effectively function and to maintain fire seal performance.

Accordingly, according to one or more embodiments as illustrated in FIG. 2 and FIG. 3, the fire seal structure 30 includes a plate spring seal 31 (first elastic seal) and a valve seal 32 (second elastic seal).

Both of the plate spring seal 31 and the valve seal 32 are disposed between the flange 11 and the peripheral wall 22, which makes it possible to maintain a state where the gap between the flange 11 and the peripheral wall 22 is sealed, irrespective of relative displacement.

Both of the plate spring seal 31 and the valve seal 32 are disposed so as to surround the entire circumference of the exhaust port 21.

In one or more embodiments, the plate spring seal 31 is integrally formed in an annular shape; however, the plate spring seal 31 may include a plurality of members that are coupled in a circumferential direction.

The valve seal 32 according to one or more embodiments is integrally formed in an annular shape; however, the valve seal 32 may include a plurality of members that are coupled in a circumferential direction.

A configuration of the plate spring seal 31 according to one or more embodiments is first described.

As illustrated in FIG. 3, the plate spring seal 31 is elastically deformed to seal the gap between the flange 11 and the peripheral wall 22 when the flange 11 and the peripheral wall 22 are brought close to each other.

The plate spring seal 31 according to one or more embodiments is made of a refractory material, and is provided on the peripheral wall 22. The plate spring seal 31 includes a fastened part 31A, a middle part 31B, and a front end part 31C.

The fastened part 31A according to one or more embodiments is a flat part disposed on an outer surface of the peripheral wall 22, and is fastened to the peripheral wall 22 by a fastening member 33.

Note that, when the plate spring seal 31 is integrally formed (e.g., welded) with the peripheral wall 22, the fastened part 31A and the fastening member 33 become unnecessary, which allows for reduction of a weight of the aircraft.

The middle part 31B extends from the fastened part 31A in a direction inclined to the flange 11.

The front end part 31C is continuous from the middle part 31B and faces a front surface of the flange 11. The front end part 31C includes a surface that is curved convexly toward the flange 11. The curved surface is to be abutted on the flat front surface of the flange 11. The front surface of the flange 11 is referred to as a seal contact surface 11A.

The plate spring seal 31 is configured so as to function as a plate spring with use of an appropriate material such as a metal material corresponding to a refractory material. As the material used for the plate spring seal 31, spring steel that has sufficiently large elastic limit and sufficiently large fatigue limit is suitable. Besides the metal material, the plate spring seal 31 may be configured with use of fiber-reinforced plastics containing glass fibers or carbon fibers, based on a verification test.

The "refractory material" indicates a material that has fire resistance sufficient to be saved from being excessively deformed, burned down, and lost even if the material is continuously exposed to flame for a predetermined fire resistance time required based on regulations, etc.

For example, corrosion-resistant steel (stainless steel, CRES) and a titanium alloy may be used as the refractory material that has sufficient fire resistance. In addition, for example, an appropriate material that has rigidity necessary for strength securement, such as an aluminum alloy, fiber-reinforced plastics containing glass fibers or carbon fibers as reinforcing fibers, and a honeycomb sandwich panel, may be used as the refractory material as long as it is confirmed in the verification test that the material has sufficient fire resistance.

The plate spring seal 31 may be formed of such a refractory material with an appropriate shape and an appropriate thickness so as to withstand flame for the necessary fire resistance time and to function as a spring.

As the plate spring seal 31, a typical plate spring that is obtained by folding a metal plate may be used. The plate spring seal 31 is folded in a shape that has a substantially C-shaped cross-section as a whole from the fastened part 31A to the front end part 31C when the plate spring seal 31 is largely elastically deformed (FIG. 5B). The plate spring seal 31 is disposed on the peripheral wall 22 in a way in which the C shape opens toward outer circumferential side of the flange 11.

Figure 4:
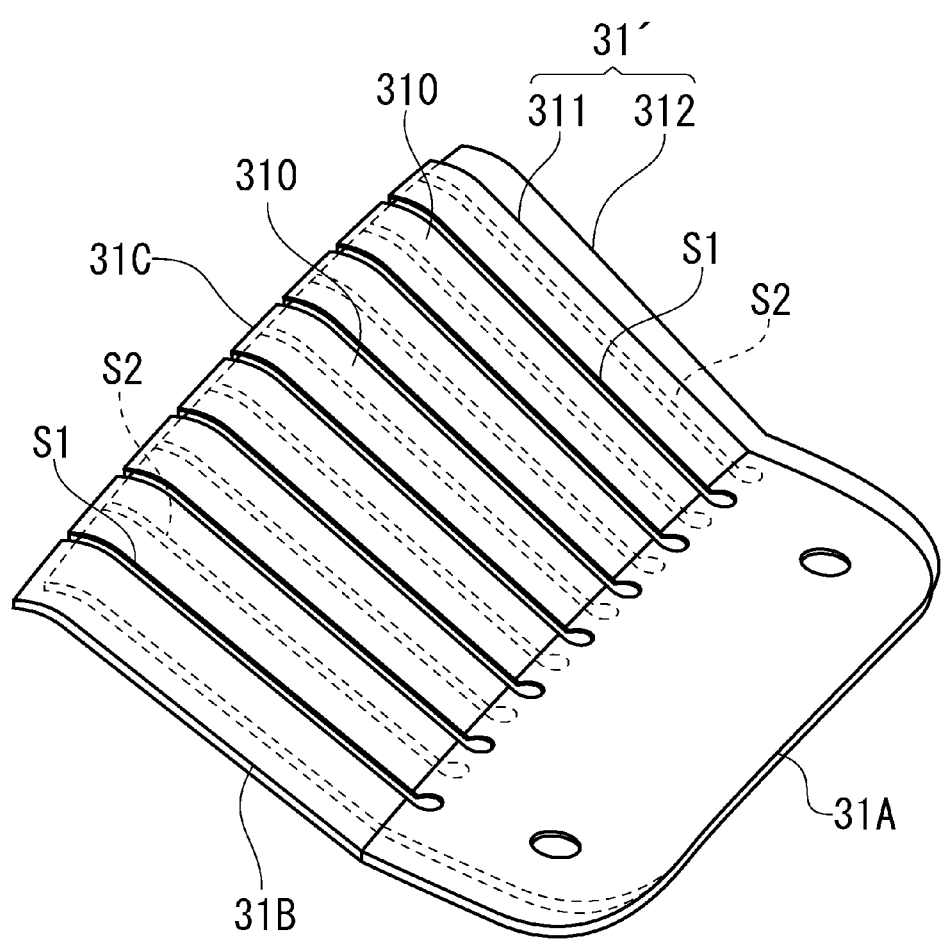
FIG. 4 is a perspective view illustrating an example of a plate spring seal configuring the fire seal structure illustrated in FIG. 3.

As the plate spring seal 31, a stacked body 31' of a plurality of plate springs 311 and 312 each including slits as illustrated in FIG. 4 may be adopted, in addition to the typical plate spring. The plate spring stacked body 31' is obtained by superposing the plurality of (in this case, two) comb tooth-shaped plate springs 311 and 312 each including the slits.

Note that it is possible to configure the plate spring seal 31 extending along the circumferential direction of the flange 11 by coupling the stacked body 31' illustrated in FIG. 4 and stacked bodies similar thereto.

As illustrated in FIG. 4, the plate spring 311 and the plate spring 312 are superposed such that a position of each of slits S1 of the plate spring 311 and a position of each part between adjacent slits S2 of the plate spring 312 correspond to each other.

Accordingly, the slits S1 are blocked by the plate spring 312 and the slits S2 are blocked by the plate spring 311. As a result, the stacked body 31' is configured as a plate spring with no slit as a whole, as with the plate spring seal 31.

The slits S1 and S2 are provided over the front end part 31C and the middle part 31B of the stacked body 31'; however, the slits S1 and S2 may be provided from the front end part 31C to the middle of the middle part 31B and root parts of the comb teeth may be remained in the middle part 31B in order to increase contact pressure to press the front end part 31C against a contact partner.

Thin parts 310 that are each located between the adjacent slits, of each of the plate springs 311 and 312 formed in a comb tooth-shape are elastically deformable individually by smaller force as compared with the plate spring with no slit. Therefore, each of the parts 310 is smoothly elastically deformed individually by a deformation amount corresponding to a size of the gap between the flange 11 and the peripheral wall 22.

According to the above-described plate spring stacked body 31', the thin parts 310 are elastically deformable individually. This makes it possible to obtain favorable following property to the front surface of the flange 11 with which the front end part 31C comes into contact when the exhaust duct 10 and the pylon fairing 20 are relatively largely moved. As a result, the plate spring stacked body 31' seals the gap between the flange 11 and the peripheral wall 22 without a space, which results in high effect of blocking passage of flame.

A small space through which the flame cannot passes or hardly passes is allowed between the front end part 31C and the front surface of the flange 11. Therefore, it is unnecessary that the front end part 31C is in tight contact with the front surface of the flange 11 and the gap between the flange 11 and the peripheral wall 22 is tightly sealed. Accordingly, it is possible to use a typical plate spring as the plate spring seal 31 as described above.

The plate spring seal 31 described above is elastically deformed by the deformation amount corresponding to the relative displacement amount between the exhaust duct 10 and the pylon fairing 20.

Figure 10A:
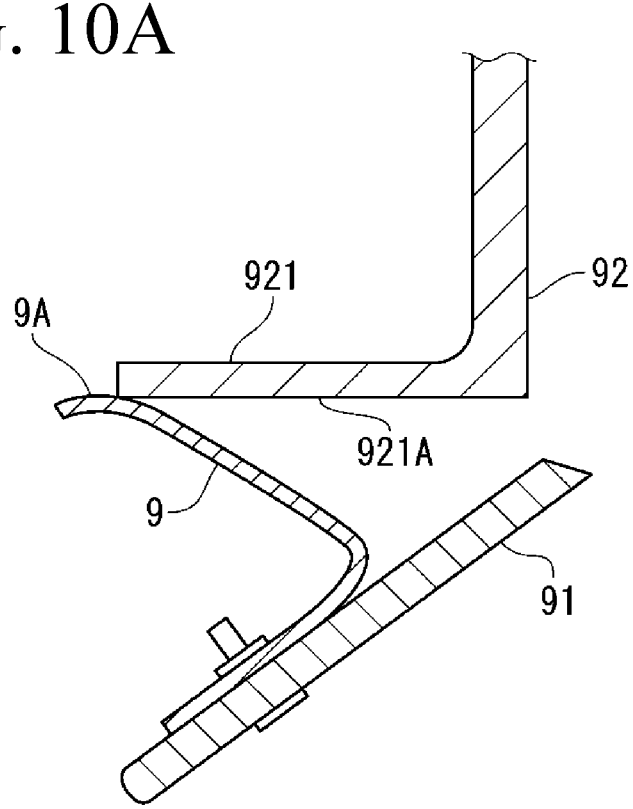
FIG. 10A is a diagram illustrating a single plate spring seal.
Figure 10B:
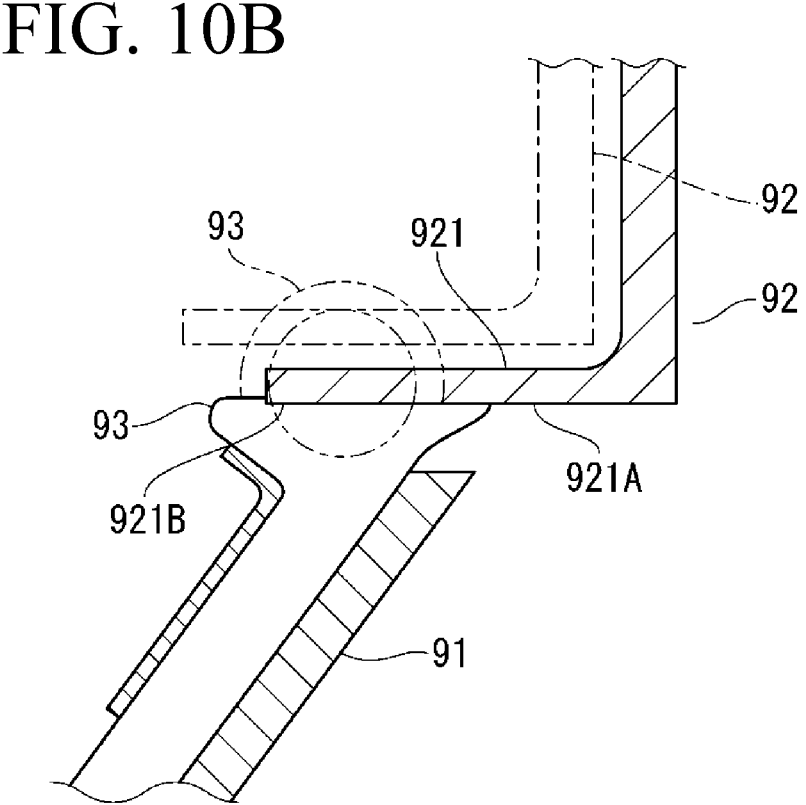
FIG. 10B is a diagram illustrating a single valve seal.

At this time, when the exhaust duct 10 and the pylon fairing 20 are relatively moved in an approaching direction, the flange 11 and the peripheral wall 22 are brought close to each other, and the front end part 31C of the elastically-deformed plate spring seal 31 is moved to the outer end 11B of the seal contact surface 11A, the plate spring seal 31 does not sufficiently function. The state is similar to the state of the plate spring seal 9 illustrated in FIG. 10A. When the front end part 31C is not pressed against the seal contact surface 11A, a space occurs between the front end part 31C and the seal contact surface 11A, and the gap between the flange 11 and the peripheral wall 22 is not sealed by the plate spring seal 31.

Further, if the front end part 31C passes over the outer end 11B and is moved to the outside of the seal contact surface 11A, the seal function by the plate spring seal 31 is completely lost.

To make the plate spring seal 31 completely function, it is sufficient to lengthen the flange 11 in the radial direction to sufficiently secure the seal contact surface 11A. The various members, however, are closely disposed around the exhaust duct 10, and it is accordingly difficult to lengthen the flange 11 any more because it is necessary to avoid interference with such members. It is difficult to lengthen the flange 11 to sufficiently secure the seal contact surface 11A because it is necessary to avoid interference with the members not only at a portion in the circumferential direction but also over the entire circumference.

It is not possible to lengthen the flange 11 any more in some cases in terms of strength securement of the flange 11 and suppression of the weight of the flange 11 in addition to the interference with the peripheral members.

Accordingly, the fire seal structure 30 includes a valve seal 32 as the second elastic seal for a case where the plate spring seal 31 does not function.

As illustrated in FIG. 3, the valve seal 32 does not exert the seal function because the valve seal 32 is not pressed against the seal contact surface 11A in a normal state, and seals the gap between the flange 11 and the peripheral wall 22 when the plate spring seal 31 does not function.

The valve seal 32 is the elastic seal that is made of a rubber material and is formed in a hollow shape. The valve seal 32 according to one or more embodiments is reinforced with use of fibers or a fabric.

The valve seal 32 is disposed on the outer surface of the peripheral wall 22, and is fastened to the peripheral wall 22 by an unillustrated fastening member.

Note that, in place of the valve seal 32, a seal that is made of a metal mesh material to have a valve cross-section and includes an internal thermal insulation material, is adoptable depending on a temperature condition.

The valve seal 32 is located in a space on the inner circumferential side of the flange 11 and the peripheral wall 22, surrounded by the plate spring seal 31, the flange 11, and the peripheral wall 22. The valve seal 32 that is located on the inner circumferential side of the flange 11 has a height lower than a height of the plate spring seal 31 that is located on the outer circumferential side having the large gap between the flange 11 and the peripheral wall 22. The plate spring seal 31 and the valve seal 32 are neatly disposed between the flange 11 and the peripheral wall 22.

Further, the valve seal 32 is away from the entire plate spring seal 31 including the fastened part 31A, and is disposed near an end part of the peripheral wall 22 on the inner circumferential side.

The valve seal 32 is located outside the plate spring seal 31 in a direction D1 (radial direction of flange 11) that passes through between the flange 11 and the peripheral wall 22 and connects the inside and the outside of the fire-prevention region 6. Therefore, the valve seal 32 is shielded from the flame inside the fire-prevention region 6 by the plate spring seal 31.

This makes it possible to appropriately select the material of the valve seal 32 from materials matched to sealing application with elastic force, such as silicone rubber, in terms of cost and availability. In other words, the valve seal 32 has high flexibility in material selection.

The valve seal 32 according to one or more embodiments is formed to have a Ω-shaped cross-section in the radial direction; however, the valve seal 32 may have other hollow cross-section such as a P-shaped cross-section.

Action of the fire seal structure 30 is described below with reference to FIGS. 5A and 5B, and FIG. 6.

Figure 5A:
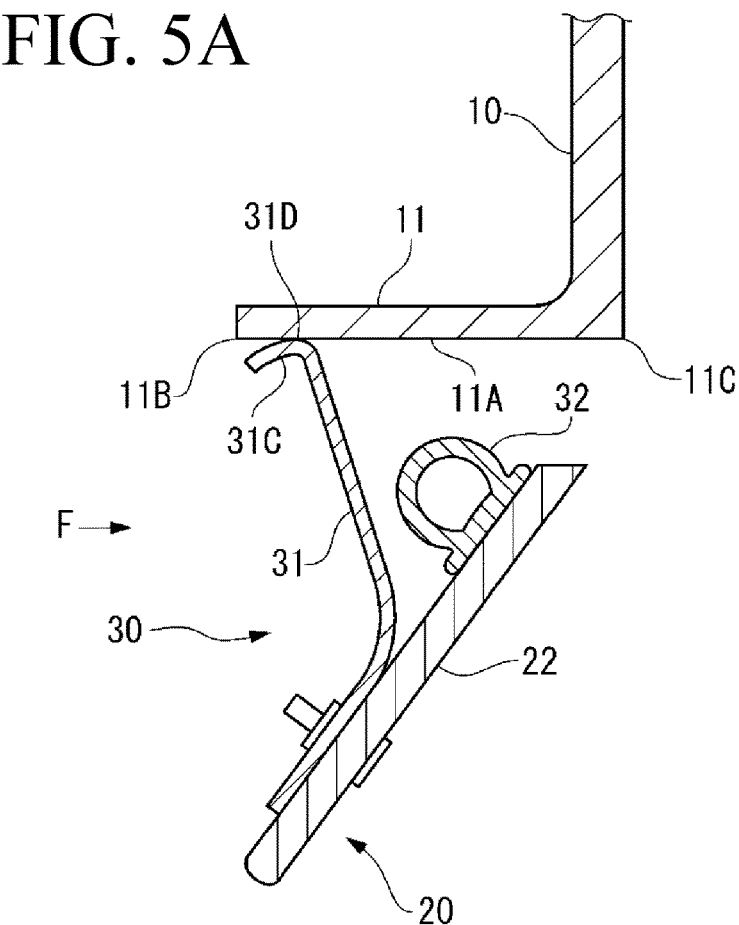
FIGS. 5A and 5B are diagrams each illustrating a state of the fire seal structure according to one or more embodiments of the invention, FIG. 5A illustrating a stationary state where the exhaust duct of the precooler and the fairing of the pylon are not relatively moved, and FIG. 5B illustrating a state where the exhaust duct of the precooler and the fairing of the pylon are moved in an approaching direction.
Figure 5B:
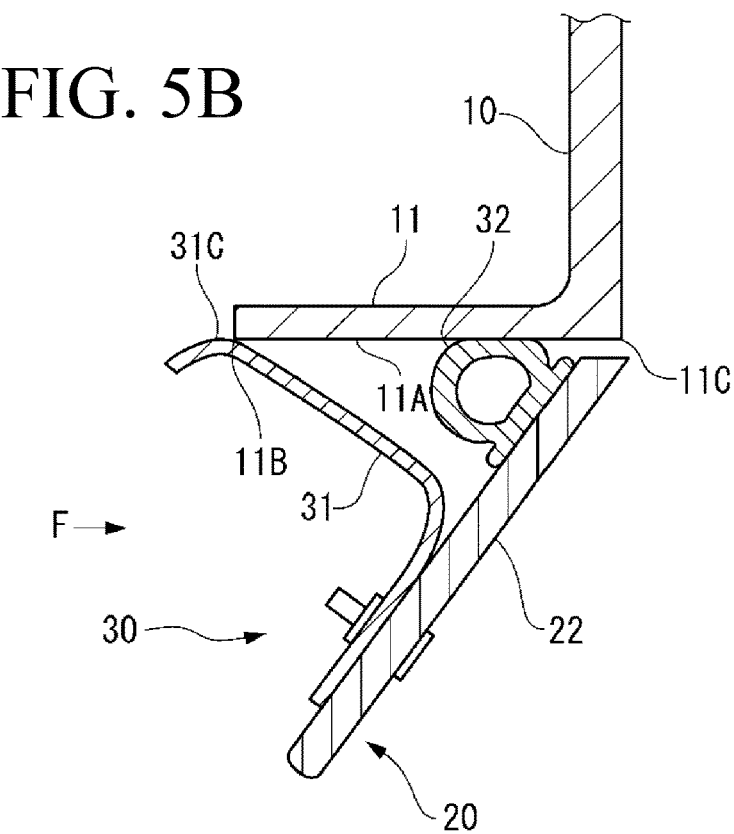

FIG. 5A illustrates a state of the fire seal structure 30 when the plate spring seal 31 functions in a stationary state where the exhaust duct 10 and the pylon fairing 20 are not relatively moved. The stationary state indicates, for example, a parking state.

The plate spring seal 31 is elastically deformed due to mutual approach of the flange 11 and the peripheral wall 22, and the plate spring seal 31 is pressed against the seal contact surface 11A, which seals the gap between the flange 11 and the peripheral wall 22. At this time, the valve seal 32 is not in contact with the seal contact surface 11A.

The plate spring seal 31 is elastically deformed by a deformation amount corresponding to relative displacement of the flange 11 of the exhaust duct 10 and the peripheral wall 22 of the pylon fairing 20.

For example, it is assumed that the exhaust duct 10 and the pylon fairing 20 are relatively moved by an estimated maximum displacement amount, for example, a displacement amount in landing, in a way in which the flange 11 and the peripheral wall 22 are separated from each other. At this time, the plate spring seal 31 is elastically deformed by a deformation amount smaller than that in the state illustrated in FIG. 5A due to the increase of the distance between the flange 11 and the peripheral wall 22. Since the front end part 31C is pressed against the seal contact surface 11A by the elastic force of the plate spring seal 31 also at this time, the gap between the flange 11 and the peripheral wall 22 is sealed.

Alternatively, also when the exhaust duct 10 and the pylon fairing 20 are relatively moved in a way in which the flange 11 and the peripheral wall 22 are brought close to each other and the plate spring seal 31 is elastically deformed, the front end part 31C is pressed against the seal contact surface 11A as long as the front end part 31C is located on the seal contact surface 11A. Therefore, the gap between the flange 11 and the peripheral wall 22 is sealed.

Even when the external force actions in the way in which the flange 11 and the peripheral wall 22 are brought close to each other and the plate spring seal 31 is elastically deformed, in a case where the external force is not extremely large because the external force is vibration associated with normal operation of the engine 1 or vibration due to airflow in cruising, the front end part 31C stays on the seal contact surface 11A and the plate spring seal 31 accordingly functions.

The plate spring seal 31 has sufficient fire resistance. Therefore, when the front end part 31C stays on the seal contact surface 11A and the plate spring seal 31 functions (in normal state), even if the flame F inside the fire-prevention region 6 is radiated to the plate spring seal 31, the plate spring seal 31 makes it possible to prevent the flame F from coming out of the fire-prevention region 6 for necessary fire resistance time.

Further, the plate spring seal 31 also makes it possible to prevent flammable gas from coming out of the fire-prevention region 6.

FIG. 5B illustrates the state of the fire seal structure 30 when the exhaust duct 10 and the pylon fairing 20 are relatively largely moved in the way in which the flange 11 and the peripheral wall 22 are brought close to each other.

In this state, the flange 11 and the peripheral wall 22 are bought close to each other by a displacement amount that exceeds the distance between the valve seal 32 and the flange 11 in the stationary state (FIG. 5A), and the front end part 31C is moved to the outside of the seal contact surface 11A associated with further approaching of the flange 11 and the peripheral wall 22 and the further elastic deformation of the plate spring seal 31. Accordingly, the plate spring seal 31 does not function.

In place of the plate spring seal 31, the valve seal 32 seals the gap between the flange 11 and the peripheral wall 22. The flange 11 and the peripheral wall 22 are brought close to each other, which brings the valve seal 32 into contact with the seal contact surface 11A. In addition, the valve seal 32 is compressed between the flange 11 and the peripheral wall 22 and is accordingly elastically deformed. The valve seal 32 is smoothly compressed because of including the internal space, and the valve seal 32 and the seal contact surface 11A come into tight contact with each other with sufficient contact area. The valve seal 32 seals the gap between the flange 11 and the peripheral wall 22.

In other words, in the state illustrated in FIG. 5B, the seal function necessary for the fire seal structure 30 is complemented by the valve seal 32 when the seal function of the plate spring seal 31 is lost.

At this time, the valve seal 32 is shielded from the flame F by the plate spring seal 31 made of the refractory material, and is not directly exposed to the flame F. If a small space is present between the front end part 31C of the plate spring seal 31 and the flange 11, it is difficult for the flame F to pass through the space.

Accordingly, the valve seal 32 is saved from being burned down and lost for a necessary fire resistance time and maintains elastic force necessary for the seal function. This makes it possible to prevent the flame F from coming out of the fire-prevention region 6 for a required fire resistance time and also to prevent flammable gas from coming out of the fire-prevention region 6.

In one or more embodiments, the valve seal 32 and the plate spring seal 31 are separated from each other, which suppresses heat conduction from the plate spring seal 31 to the valve seal 32. This also contributes to maintaining of the seal function of the valve seal 32 for the fire resistance time.

The valve seal 32 according to one or more embodiments functions before the seal function by the plate spring seal 31 is completely lost (FIG. 5B), in order to maintain the sealed state of the gap between the flange 11 and the peripheral wall 22 without interruption.

Figure 6:
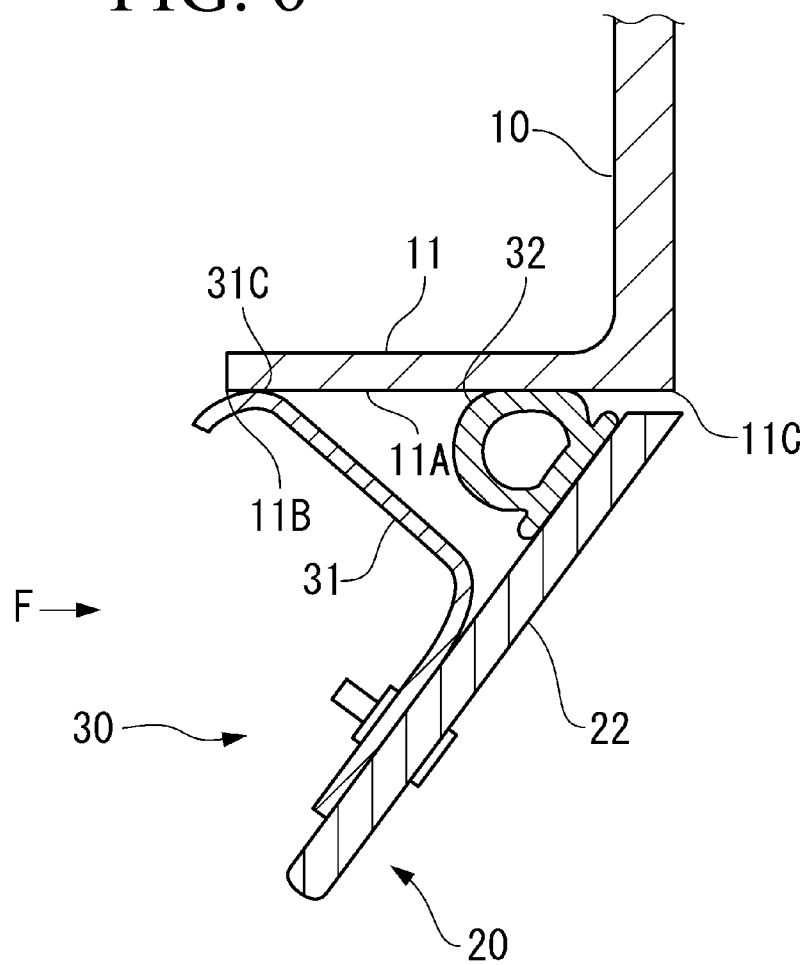
FIG. 6 is a diagram illustrating a state where both of a first elastic seal and a second elastic seal provided in the fire seal structure are pressed against a seal contact surface according to one or more embodiments of the invention.

In other words, according to one or more embodiments, when the exhaust duct 10 and the pylon fairing 20 are moved in the way in which the flange 11 and the peripheral wall 22 are brought close to each other and the plate spring seal 31 is elastically deformed, the valve seal 32 comes into contact with the seal contact surface 11A and is elastically deformed while the front end part 31C of the plate spring seal 31 is pressed against the seal contact surface 11A as illustrated in FIG. 6.

When the flange 11 and the peripheral wall 22 are relatively largely moved in the way in which the flange 11 and the peripheral wall 22 are brought close to each other and the plate spring seal 31 is elastically deformed, the deformation state may be changed to the state illustrated in FIG. 5B through the state illustrated in FIG. 6. Alternatively, the plate spring seal 31 may maintain the function also in the relative displacement by the maximum displacement amount, and the gap between the flange 11 and the peripheral wall 22 may be sealed by both of the plate spring seal 31 and the valve seal 32.

As illustrated in FIG. 5B and FIG. 6, when the exhaust duct 10 and the pylon fairing 20 are relatively largely moved in the way in which the flange 11 and the peripheral wall 22 are brought close to each other and the plate spring seal 31 is elastically deformed, the valve seal 32 is also compressed and is elastically deformed. As a result, it is possible to absorb larger relative displacement by the elastic deformation of the plate spring seal 31 and the valve seal 32, as compared with a case where only the plate spring seal 31 is elastically deformed.

Accordingly, as compared with a case where the plate spring seal 31 is singularly used, with respect to the same relative displacement amount, it is possible to hold the front end part 31C on the seal contact surface 11A and to cause the plate spring seal 31 to function even when the length of the flange 11 in the radial direction is reduced, and it is possible to maintain the sealed state by the valve seal 32 even if the front end part 31C goes beyond the seal contact surface 11A. Reducing the length of the flange 11 makes it possible to enhance installation flexibility of the exhaust duct 10 and the peripheral members, and to suppress the weight of the aircraft.

The fire seal structure 30 described above includes the valve seal 32 that functions when the large relative displacement occurs in the way in which the flange 11 and the peripheral wall 22 are brought close to each other and the plate spring seal 31 is elastically deformed. Accordingly, it is possible to surely seal the gap between the flange 11 and the peripheral wall 22 even when the large relative displacement occurs.

Since the plate spring seal 31 is made of the refractory material and the valve seal 32 is shielded from flame by the plate spring seal 31, it is possible to secure sufficient fire seal performance for a predetermined fire resistance time.

The position at which the front end part 31C of the plate spring seal 31 comes into contact with the seal contact surface 11A is moved in the radial direction according to the elastic deformation amount. Therefore, in a case where it is not possible to extend the seal contact surface 11A in the radial direction when the connection portion between the members that are relatively largely displaced is sealed, the valve seal that is crushed at the installed position is typically used according to one or more embodiments.

The fire seal structure 30, however, adopts the plate spring as the first elastic seal and includes the second elastic seal (valve seal 32) that functions when the large relative displacement occurs. Accordingly, it is possible to securely seal the gap without extending the seal contact surface 11A even when the large relative displacement occurs.

At this time, it is significant to adopt the plate spring seal 31 as the first elastic seal that functions by being pressed against the seal contact surface 11A in the normal state including the stationary state. It is not essential whether the second elastic seal is the valve seal 32 or a plate spring seal.

The plate spring seal 31 is made of a material such as a metal material and is configured to function as the plate spring. Therefore, even if the front end part 31C slides on the seal contact surface 11A according to the elastic deformation amount of the plate spring seal 31, the plate spring seal 31 is hardly abraded as compared with the valve seal 32 made of the rubber material. Even if the plate spring seal 31 comes into contact with the outer end 11B of the seal contact surface 11A, the plate spring seal 31 is hardly damaged unlike the valve seal.

Therefore, it is unnecessary to frequently perform maintenance of the plate spring seal 31, such as inspection and replacement, unlike the valve seal.

Further, even when the valve seal 32 is used as the second elastic seal, the valve seal 32 does not seal the gap between the flange 11 and the peripheral wall 22 and does not function in the normal state including the stationary state. When the valve seal 32 does not perform sealing, namely, when the valve seal 32 is not pressed against the seal contact surface 11A, friction between the valve seal 32 and the seal contact surface 11A is small even if the valve seal 32 is in contact with the seal contact surface 11A. In one or more embodiments, the valve seal 32 is not in contact with the seal contact surface 11A and is not abraded in the normal state.

According to the fire seal structure 30, the valve seal 32 is little abraded as compared with the single valve seal that is constantly pressed, because the valve seal 32 is not in contact with the seal contact surface 11A except when the large relative displacement occurs in the way in which the flange 11 and the peripheral wall 22 are brought close to each other (FIG. 5B and FIG. 6).

Accordingly, the fire seal structure 30 has a long lifetime, which makes it possible to reduce burden on maintenance such as inspection and replacement necessary for keeping the fire seal performance.

The seal structure of one or more embodiments of the present invention is not limited to the above-described embodiments (FIG. 3) and may be variously modified.

Figure 7A:
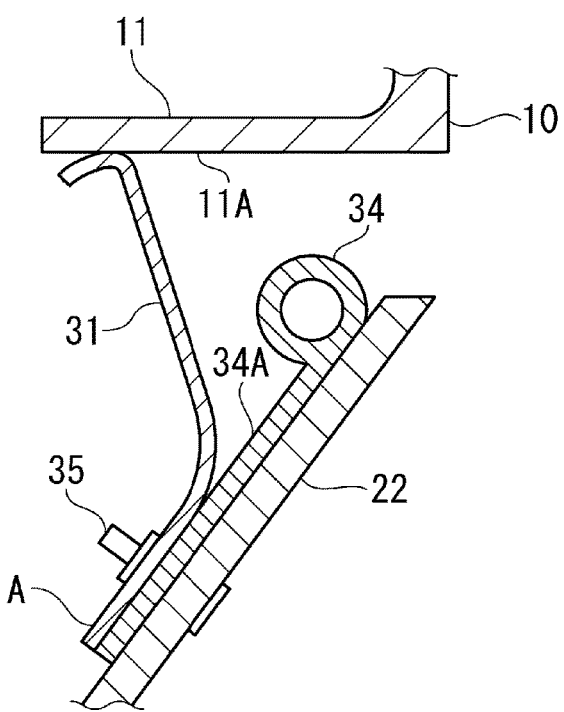
FIGS. 7A to 7C are cross-sectional views each illustrating a modification of the seal structure of one or more embodiments of the present invention.

For example, in an example illustrated in FIG. 7A, the plate spring seal 31 is fastened to the peripheral wall 22, and a valve seal 34 is fastened, together with the plate spring seal 31, to the peripheral wall 22 by a fastening member 35 that fastens the plate spring seal 31. In other words, the plate spring seal 31 and the valve seal 34 are fastened together.

The valve seal 34 is formed to have a P-shaped cross-section in this example, and is fastened together while a flat part 34A of the valve seal 34 is sandwiched between the fastened part 31A of the plate spring seal 31 and the peripheral wall 22.

When the same fastening member 35 is used for the plate spring seal 31 and the valve seal 34 that are both fastened to the peripheral wall 22, the number of fastening member is decreased, and downsizing and weight reduction are accordingly achievable.

Figure 7B:
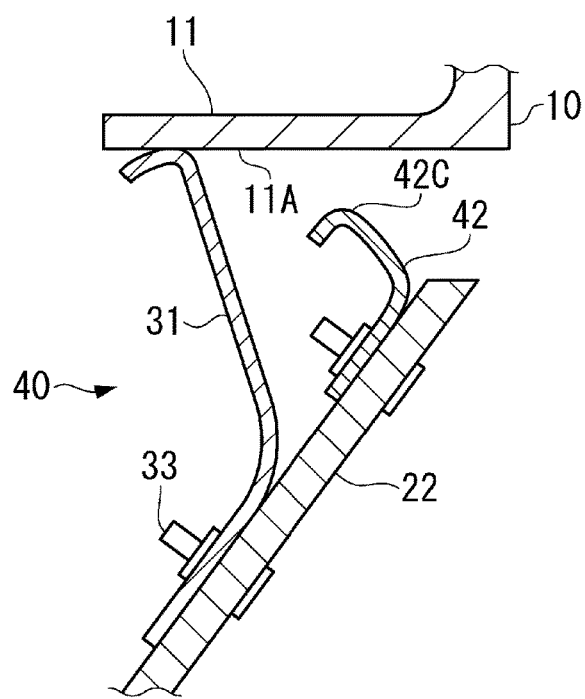

A fire seal structure 40 illustrated in FIG. 7B includes the first plate spring seal 31 as the first elastic seal and a second plate spring seal 42 as the second elastic seal.

The second plate spring seal 42 is not in contact with the seal contact surface 11A in the normal state including the stationary state, and a front end part 42C thereof is pressed against the seal contact surface 11A when the flange 11 and the peripheral wall 22 are relatively displaced in the way in which the flange 11 and the peripheral wall 22 are brought close to each other, as with the valve seal 32 (FIG. 3) in the above-described embodiments.

As with the first plate spring seal 31, the second plate spring seal 42 is made of a material such as a metal material and is configured to function as the plate spring. Therefore, abrasion when the second plate spring seal 42 is in contact with the seal contact surface 11A is small as compared with the valve seal 32, and the second plate spring seal 42 is excellent in fire resistance as compared with the valve seal 32.

Figure 7C:
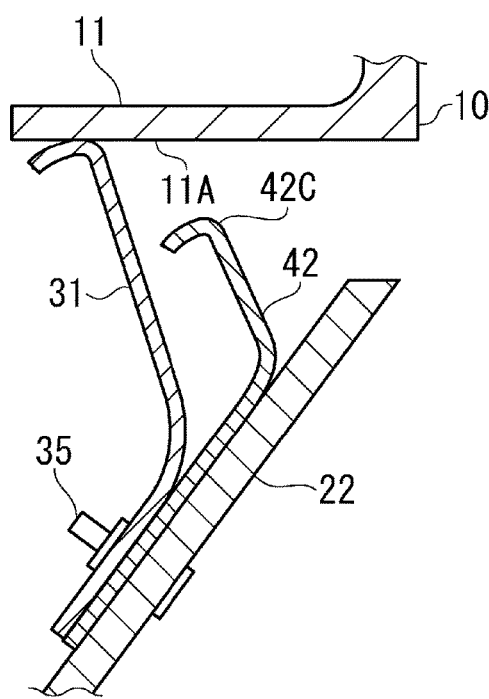

FIG. 7C illustrates a configuration in which the two plate spring seals 31 and 42 are fastened together by the fastening member 35.

The shape and installation of each of the first elastic seal and the second elastic seal are appropriately changeable.

Figure 8A:
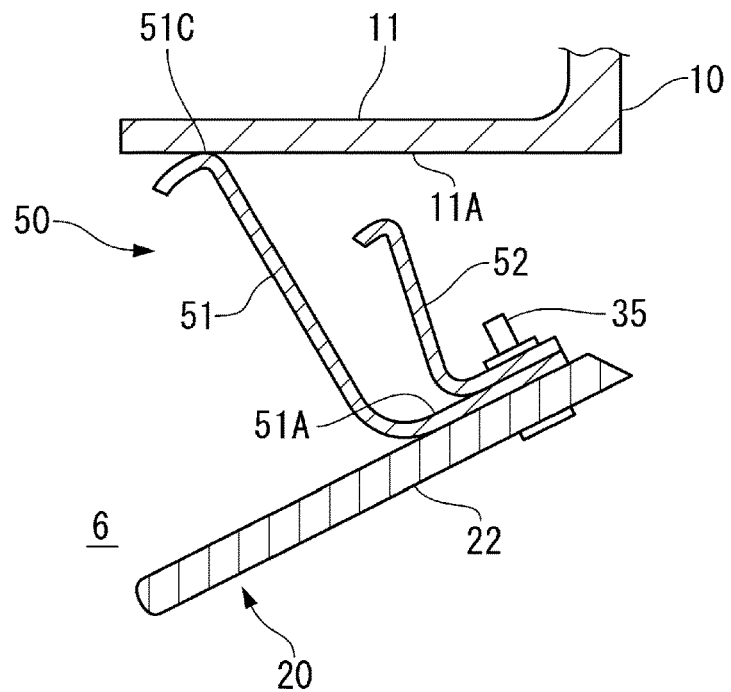
FIGS. 8A to 8C are cross-sectional views each illustrating a modification of the seal structure of one or more embodiments of the present invention.

A plate spring seal 51 that is provided as the first elastic seal in a fire seal structure 50 illustrated in FIG. 8A is made of a refractory material so as to have an S-shaped or Z-shaped cross-section. A base end part 51A of the plate spring seal 51 is fastened to inner end side of the peripheral wall 22, and a front end part 51C of the plate spring seal 51 is pressed against the seal contact surface 11A on outer end side of the flange 11.

Further, a plate spring seal 52 that is provided as the second elastic seal in the fire seal structure 50 is also formed to have an S-shaped or Z-shaped cross-section, and is fastened together with the plate spring seal 51.

The plate spring seal 52 is lower in height than the plate spring seal 51, and is located on inner circumferential side on which the gap between the flange 11 and the peripheral wall 22 is small. Accordingly, the two seals 51 and 52 are neatly disposed between the flange 11 and the peripheral wall 22.

In the stationary state where the flange 11 and the peripheral wall 22 are not relatively moved, only the plate spring seal 51 functions, and the plate spring seal 52 that is not in contact with the seal contact surface 11A does not function. When the plate spring seal 51 is further elastically deformed from the state illustrated in FIG. 8A in a way in which the base end part 51A and the front end part 51C are separated from each other in the radial direction, the plate spring seal 52 is pressed against the seal contact surface 11A and exerts the seal function.

The plate spring seal 52 is located on inner circumferential side of the flange 11 and the peripheral wall 22, and is shielded from flame by the plate spring seal 51, as with the valve seal 32 in FIG. 3. Accordingly, it is unnecessary to increase a thickness of the plate spring seal 52 or use a refractory material for the plate spring seal 52 in order to withstand radiation of the flame.

The first elastic seal and the second elastic seal provided in the seal structure of one or more embodiments of the present invention may be provided on one of the peripheral wall 22 and the flange 11 that form the gap to be sealed.

Figure 8B:
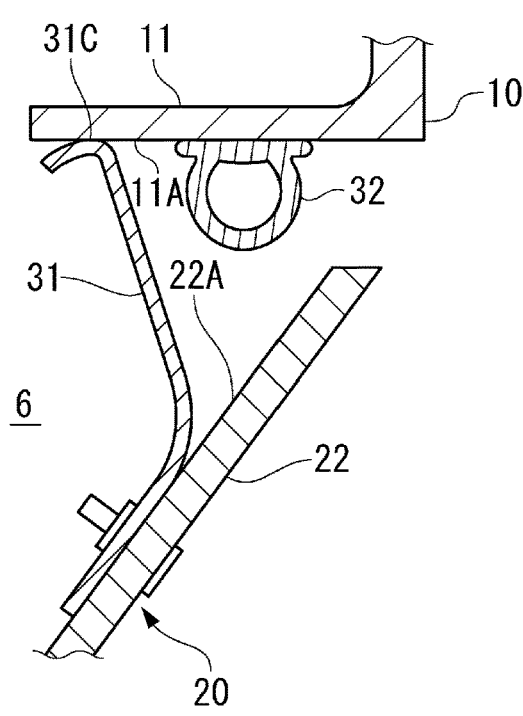

For example, in an example illustrated in FIG. 8B, the plate spring seal 31 as the first elastic seal is provided on the peripheral wall 22, and the valve seal 32 as the second elastic seal is provided on the flange 11. In other words, the seal contact surface 11A with which the first elastic seal comes into contact and a seal contact surface 22A with which the second elastic seal comes into contact may be different from each other.

Figure 8C:
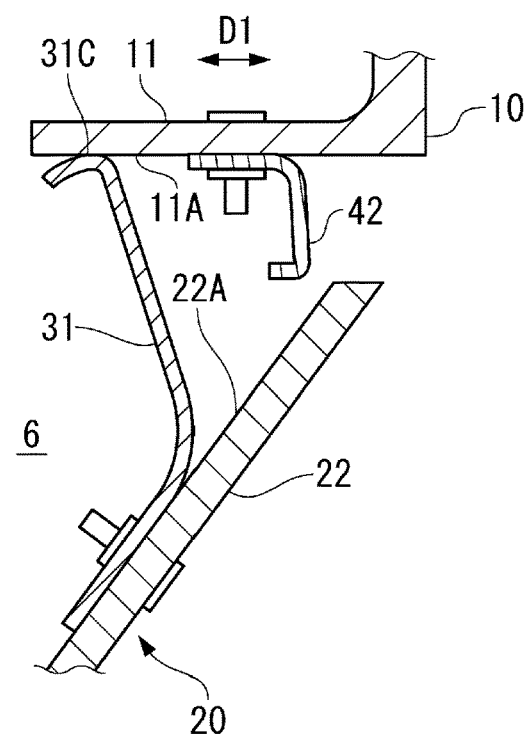

As illustrated in FIG. 8C, a plate spring seal 42 may be provided on the flange 11, in place of the valve seal 32 of FIG. 8B.

The configurations respectively illustrated in FIGS. 8B and 8C make it possible to seal the gap between the flange 11 and the peripheral wall 22 by the valve seal 32 or the plate spring seal 42 that are not in contact with the peripheral wall 22 in the normal state, when the large relative displacement occurs in the way in which the flange 11 and the peripheral wall 22 are brought close to each other.

In the configuration illustrated in FIG. 8C, the plate spring seal 31 provided on the peripheral wall 22 projects toward the flange 11, and the plate spring seal 42 provided on the flange 11 projects toward the peripheral wall 22. The plate spring seals 31 and 42 are arranged so as to alternately project in a direction intersecting the direction D1 that passes through between the flange 11 and the peripheral wall 22 and connects the inside and the outside of the fire-prevention region 6. The front end side of the plate spring seal 31 and the front end side of the plate spring seal 42 are overlapped with each other.

As a result, even if flame enters the gap between the front end part 31C of the plate spring seal 31 and the flange 11, the flame abuts on the plate spring seal 42 because the flame has straight travel property. Accordingly, it is also possible to prevent the flame from coming out of the fire-prevention region 6 by a labyrinth effect.

The seal structure of one or more embodiments of the present invention is not limited to the seal structure that seals the gap between the flange 11 and the peripheral wall 22 inclined to the flange 11 as described in the embodiments and the modifications described above.

Figure 9A:
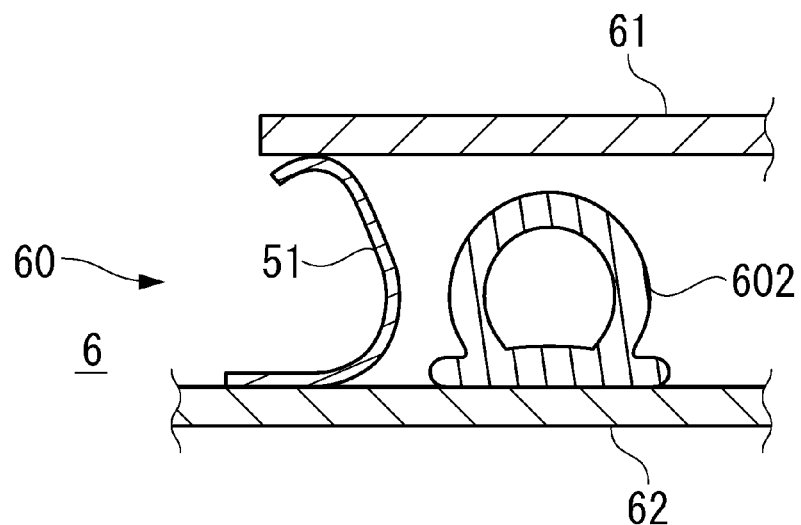
FIGS. 9A and 9B are cross-sectional views each illustrating a modification of the seal structure of one or more embodiments of the present invention.

As with a fire seal structure 60 illustrated in FIG. 9A, the seal structure may seal a gap between a first member 61 and a second member 62 that are disposed in parallel to each other. The fire seal structure 60 includes the plate spring seal 51 as the first elastic seal and a valve seal 602 as the second elastic seal. The valve seal 602 may be replaced with a plate spring seal.

Figure 9B:
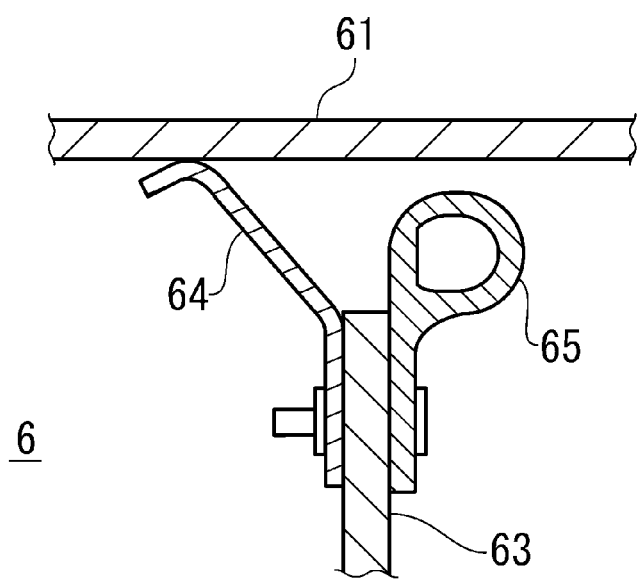

Moreover, as with an example illustrated in FIG. 9B, a gap between the first member 61 and a second member 63 that is disposed in a direction intersecting the first member 61 may be sealed by at least a plate spring seal 64 as the first elastic seal, out of the plate spring seal 64 and a second elastic seal 65. The plate spring seal 64 disposed on one of surfaces of the second member 63 and the second elastic seal 65 disposed on the other surface of the second member 63 may be fastened together.

Other than the above, the configurations described in the above-described embodiments may be selected or appropriately modified without departing from the scope of the present invention.

The seal structure of one or more embodiments of the present invention may not be used as the fire seal. For example, the seal structure of one or more embodiments of the present invention may be used to prevent flammable gas from flowing out from a gap between members. In this case, it is unnecessary to use the refractory material for the first elastic seal.

The above-described connection portion between the exhaust duct 10 and the pylon fairing 20 is merely an example of an object to which the seal structure of one or more embodiments of the present invention is applied, and the seal structure of one or more embodiments of the present invention is applicable to a connection portion between other members of the aircraft.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

1 Engine
2 Pylon (engine pylon)
2A Pylon main body (main body)
3 Fan
4 Engine core
5 Engine nacelle
6 Fire-prevention region
9 Plate spring seal
10 Exhaust duct (first member)
11 Flange
11A Seal contact surface
11B Outer end
11C Inner end
20 Pylon fairing (second member)
21 Exhaust port
21A Blade member
22 Peripheral wall (wall)
22A Seal contact surface
30 Fire seal structure
31 Plate spring seal (first elastic seal)
31' Plate spring stacked body
31A Fastened part
31B Middle part
31C Front end part
32 valve seal (second elastic seal)
33 Fastening member
34 valve seal (second elastic seal)
34A Part
35 Fastening member
40 Fire seal structure
42 Plate spring seal (second elastic seal)
50 Fire seal structure
51 Plate spring seal (first elastic seal)
51A Base end part
51C Front end part
52 Plate spring seal (second elastic seal)
60 Fire seal structure
61 First member
62 Second member
310 Part
311, 312 Plate spring
602 Valve seal (second elastic seal)
91 Member
92 Member
93 Valve seal
921 Flange
921A Seal contact surface
921B End edge
D1 Direction
F Flame
S1, S2 Slit

What is claimed is:

1. A seal structure that seals a gap between a first member and a second member of an aircraft, the seal structure comprising:
   a plate spring-shaped first elastic seal; and
   a second elastic seal,
   wherein the first and the second elastic seals are disposed between the first and the second members,
   wherein the first elastic seal is configured to, when the first and the second members are stationary with respect to each other, elastically deform between the first and the second members to seal the gap and to, when the first and the second members move closer to each other, further elastically deform so as not to seal the gap, whereas the second elastic seal is configured not to seal the gap in a state where the first elastic seal seals the gap when the first and the second members are stationary with respect to each other and to, when the first and the second members move closer to each other and the first elastic seal does not seal the gap, elastically deform between the first and the second members to seal the gap.

2. The seal structure for the aircraft according to claim 1, wherein the second elastic seal is provided in one of the first and the second members, and
   wherein, when the first and the second members are stationary with respect to each other, the second elastic seal is not in contact with another one of the first and the second members.

3. The seal structure for the aircraft according to claim 1, wherein the first elastic seal is configured to, when the first and the second members are stationary with respect to each other, elastically deform between the first and the second members so that a front end part of the first elastic seal is pressed against a seal contact surface of the first member and to, when the first and the second members move closer to each other, elastically further deform so that the front end part is allowed to move toward an outer end of the seal contact surface on the seal contact surface,
   wherein the second elastic seal is configured not to be in contact with the seal contact surface in order not to seal the gap in a state where the first elastic seal seals the gap by the front end part being pressed against the seal contact surface when the first and the second members are stationary with respect to each other, and to, when the first and the second members move closer to each other and the first elastic seal is further elastically deforms, elastically deform between the first and the second members to seal the gap before the front end part reaches the outer end.

4. The seal structure for the aircraft according to claim 1, wherein one of the first and the second members is inclined toward the other of the first and the second members,
   wherein the gap is larger on a first side than a second side,
   wherein the first elastic seal is disposed on the first side, and
   wherein the second elastic seal is disposed on the second side.

5. The seal structure for the aircraft according to claim 1, wherein the first and the second members define a fire-prevention region of the aircraft,
   wherein the seal structure is a fire seal structure that seals the gap to prevent flame from coming out of the fire-prevention region, and
   wherein the first elastic seal is located on an inner side in a direction that passes through between the first and the second members and connects an inside and an outside of the fire-prevention region, and contains a refractory material.

6. The seal structure for the aircraft according to claim 1, wherein the second elastic seal contains a rubber material.

7. The seal structure for the aircraft according to claim 1, wherein the second elastic seal is a hollow valve seal.

8. The seal structure for the aircraft according to claim 1, wherein the second elastic seal is a plate spring seal.

9. The seal structure for the aircraft according to claim 1,
- wherein the first elastic seal is fastened to one of the first and the second members, and
- wherein the second elastic seal is fastened, together with the first elastic seal, to the one of the first and the second members by a fastening member that fastens the first elastic seal.

10. The seal structure for the aircraft according to claim 1,
- wherein the first member is a duct of a device that is supported by a main body of an engine pylon of the aircraft,
- wherein the second member is a fairing that covers the main body and includes an opening that communicates with the duct, and
- wherein the seal structure seals a gap between a flange provided in the duct and a wall provided in the fairing so as to surround the opening.

11. An aircraft comprising the seal structure according to claim 1.

\* \* \* \* \*